United States Patent
Schmitt

(10) Patent No.: US 7,743,015 B2
(45) Date of Patent: Jun. 22, 2010

(54) DATA PROCESSING SYSTEMS AND METHODS

(75) Inventor: Winfried Schmitt, Walldorf (DE)

(73) Assignee: SAP AG, Walldorf (DE)

(*) Notice: Subject to any disclaimer, the term of this patent is extended or adjusted under 35 U.S.C. 154(b) by 396 days.

(21) Appl. No.: 11/154,719

(22) Filed: Jun. 17, 2005

(65) Prior Publication Data

US 2005/0289129 A1    Dec. 29, 2005

(30) Foreign Application Priority Data

Jun. 23, 2004    (EP) .................................. 04014696

(51) Int. Cl.
G06F 7/00 (2006.01)
G06F 17/00 (2006.01)

(52) U.S. Cl. ................. 707/600; 707/607; 707/610

(58) Field of Classification Search .................. None
See application file for complete search history.

(56) References Cited

U.S. PATENT DOCUMENTS

| | | | | |
|---|---|---|---|---|
| 5,799,300 | A * | 8/1998 | Agrawal et al. ................. 1/1 |
| 5,890,151 | A * | 3/1999 | Agrawal et al. ................. 707/5 |
| 6,003,036 | A * | 12/1999 | Martin ................. 707/102 |
| 6,408,292 | B1 * | 6/2002 | Bakalash et al. ................. 1/1 |
| 6,434,544 | B1 * | 8/2002 | Bakalash et al. ................. 1/1 |
| 6,480,842 | B1 * | 11/2002 | Agassi et al. ................. 707/4 |
| 6,510,457 | B1 * | 1/2003 | Ayukawa et al. ................. 709/217 |
| 6,983,286 | B1 * | 1/2006 | Sinha et al. ................. 707/102 |
| 7,149,736 | B2 * | 12/2006 | Chkodrov et al. ................. 1/1 |
| 7,225,302 | B2 * | 5/2007 | Conrad et al. ................. 711/152 |
| 7,249,118 | B2 * | 7/2007 | Sandler et al. ................. 1/1 |
| 2002/0032676 | A1 | 3/2002 | Reiner et al. |
| 2002/0165724 | A1 * | 11/2002 | Blankesteijn ................. 705/1 |
| 2003/0225798 | A1 | 12/2003 | Norcott |
| 2004/0199618 | A1 * | 10/2004 | Knight et al. ................. 709/223 |

OTHER PUBLICATIONS

Widom, J., "Research in Problems in Data Warehousing," Proceedings of the 1995 ACM International Conference on Information Management ACM, New York, NY, USA, pp. 25-30, Dec. 1995.
Meghini, C. et al., "The Complexity of Operations on a Fragmented Relation," ACM Transactions on Database Systems USA, vol. 16, No. 1, pp. 56-87, Mar. 1991.
Ives Z. et al., "An Adaptive Query Execution System for Data Integration," Sigmod Record ACM USA, vol. 28, No. 2, pp. 299-310, Jun. 1999.
European Search Report dated Dec. 6, 2004, 8 pages.

* cited by examiner

Primary Examiner—Charles Rones
Assistant Examiner—Daniel Kuddus
(74) Attorney, Agent, or Firm—Finnegan, Henderson, Farabow, Garrett & Dunner, L.L.P.

(57) ABSTRACT

Data processing systems and methods are provided having an on-line transaction processing (OLTP) database and an on-line analysis processing (OLAP) database. The OLAP and OLTP databases are synchronized periodically. In response to a user's query, OLAP cube data that is available in the OLAP database is complimented with data from the OLTP database for inclusion of up-to-date data into the on-line analysis processing.

9 Claims, 2 Drawing Sheets

DATA PROCESSING SYSTEMS AND METHODS

FIELD OF THE INVENTION

The present invention generally relates to the field of data processing systems and related methods. More particularly, the invention relates to on-line analysis processing (OLAP) database structures.

BACKGROUND OF THE INVENTION

Conventional relational databases are well known and data collected in support of large enterprises is often collected into relational databases. For example, an enterprise with a sales operation might store all of their data relating to sales transactions in a relational database. A relational database structure defines the tables making up the relational database, along with definitions for the rows and columns of the tables and the relations between tables.

For example, a relational sales database might have an invoice table and a customer table. The invoice table might have columns for an invoice number, customer number, salesperson, sales date, shipping date, etc., with one row per "instance" in the table. In this example, an instance is an invoice. The customer table might have one row per unique customer, and columns for a customer number, customer name, address, credit limit, etc. As for the relations between tables, the relational sales database might relate customer numbers in the invoice table with customer numbers in the customer table.

Such relational structures are well known and methods for navigating large relational databases are known. For example, a user at a relational database client might formulate a Structured Query Language ("SQL") statement and submit that SQL statement to a relational database server. The relational database server would respond to the submission with a table of results that matched the SQL statement. For example, a user might request a list of invoices for a given day listing the customer, the salesperson, and the amount for each such invoice. The list might be informative if the enterprise only makes a few sales per day, but is less likely to be informative if the enterprise makes thousands of sales per day.

To provide workers with informative views of an enterprise's data, analytical systems are often employed. One example of an analytical system is a data warehouse. A data warehouse contains much the same data as the relational database, but in a much different form. As should be apparent with the examples used above, adding one more invoice to the relational database could be as simple as adding a record with the invoice pertinent data to the invoice table.

For this reason, large relational databases used in this way are often referred to as on-line transaction processing ("OLTP") systems. By contrast, the data warehouse usually stores data in aggregate, to allow for high-level analysis of the data. Often the data is aggregated according to multiple criteria, to provide access to data and aggregations much faster than if the same information were obtained from a relational database system.

Such systems of replicated and/or aggregated data are often referred to as on-line analytical processing ("OLAP") systems. In a typical enterprise, the data warehouse is populated and updated periodically from the OLTP data. For example, U.S. Patent Publication No. 2003/0225798 shows a method of capturing data from on OLTP for data warehousing.

The updating process might, for example, provide invoice totals and other data extracted from the OLTP data to the OLAP data structures on a once-daily update. Using an OLAP system, a user might request a chart of the sales by geographic region broken down by month for a year's worth of data.

If such a request were to be made of the OLTP data structures, a server responding to that request would have to scan all the records in several tables to come up with totals for the chart. With one request, the scan might be easy, but when many requests are being made, it is more efficient to make those requests of an OLAP system, since the results for the chart may be obtained by taking the appropriate slice of data from the OLAP data structures. Sometimes, an OLAP data system is represented as a multi-dimensional data structure and each OLAP query is simply a "slice" through this multi-dimensional data structure.

In one common analytical application, a user is presented with a user interface at an OLAP client and uses that OLAP client to "navigate" a set of "cubes" (the multi-dimensional, or "MD" data structure) that were created from the OLTP data structures. Using that OLAP client, the user may navigate the OLAP data using top-down slicing and narrowing mechanisms, looking for points of interest within the information presented.

U.S. Pat. No. 6,480,842 shows a system, including a method for navigating between dimensions and domains, that allows for an interactive response to a query based on data stored in at least one on-line transaction processing (OLTP) database structure and data stored in at least one on-line analysis processing (OLAP) database structure. The system includes a dimension to domain server, which interacts with a user interface client, which presents to a user, representations of elements of the OLTP database structure and representations of elements of the OLAP database structure. The user interface client also includes logic to accept a selection of representations of elements selected by the user, and if the selection comprises more than one element, an association among the elements in the selection. An element relator is provided that relates one or more elements of the OLTP database structure to one or more elements of the OLAP processing database structure when the selection of representations includes at least one element from the OLTP database structure and at least one element from the OLAP database structure. A query formulator, coupled to the user interface client, formulates the query based on the selection and any associations. The query formulator is also coupled to the element relator when at least one association of the selection is an association between at least one element from the OLTP database structure and at least one element from the OLAP database structure. A query server receives the query from the query formulator and provides responses to the query received from the query formulator.

As the execution of queries in the OLTP database is expensive in terms of the required computational resources and due to the negative impact of such queries on the real-time capability of such an OLTP database, embodiment of the invention can provide an improved data processing system that reduces that amount of access operations to the OLTP database, while providing a user with most up-to date data for analytical purposes.

SUMMARY OF THE INVENTION

Consistent with the present invention, a data processing system is provided that comprises a relational database for storage of transaction data and an OLAP database for storage of a replication of the transaction data in one or more OLAP cubes. The replication of the transaction data may be a copy of the transaction data or an aggregation of the transaction data.

Data replication, i.e., the export of transaction data from the relational database into the OLAP database, may be performed at defined replication times. This may be done at predefined replication times, periodically, or in accordance with a customized replication scheme. Typically, data replication is performed daily during the night when no or little real time transaction data is entered into the relational database.

A user's data request specifies at least a time interval of interest to the user. In response to the data request, the requested data is read from the respective OLAP cube and the OLAP cube data is stored in a random access memory. The OLAP cube data only contains data up to the last replication time. Transaction data that has been stored in the relational database after the last data replication is not present in the OLAP cube data.

In order to provide a complete response to the user's data request, a query is generated that specifies a time interval spanning the time between the last replication time and the upper limit of the time interval specified in the user's data request. This query is executed by the relational database, which provides the transaction data missing in the OLAP cube data.

The data that is provided by the relational database in response to the query is also stored in random access memory. An output is generated in response to the user's data request on the basis of both the OLAP cube data and the data provided by the relational database in response to the query. Preferably, the data is outputted in a form that is familiar to the user, such as in the form of tabular data table, pie chart, or another convenient output format.

An advantage of embodiments of the present invention is that they can enable the inclusion of current transaction data into on-line analysis processing, while only minimally loading the relational database that performs the on-line transaction processing. This has the advantage that the real time capability of the relational database for the on-line transaction processing is not substantially affected while the user is provided with complete and most up to date data for on-line analytical processing. This may be accomplished by using the data already stored in the OLAP database and completing this data from the relational database by querying the relational database for data that is more recent than the last replication time. This minimizes the number of time consuming mass storage access operations in the relational database structure.

Another advantage of embodiments of the present invention is that the process for completion of the data stored in the OLAP data structure with data received in response to the query from the OLTP database structure may be completely encapsulated, such that no additional complexity needs to be added to the user interface.

In accordance with an embodiment of the invention, the OLAP database includes a plurality of OLAP cubes. Structural cube definition data that defines the structure of a cube but does not contain actual data values is stored for each such OLAP cube. The user may specify one of the OLAP cube names in his or her data request. In response, the OLAP cube data of the specified OLAP cube is read and stored temporarily in random access memory. The structural cube definition data of the respective OLAP cube is used for formulating the query that is sent to the OLTP database. For example, the query is formulated by means of an SQL statement corresponding to the structural cube definition data.

It is to be noted that the present invention has applications in many fields, such as financial data processing systems, logistics data processing systems, supply chain management data processing systems, and manufacturing control data processing systems.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show certain aspects of the present invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
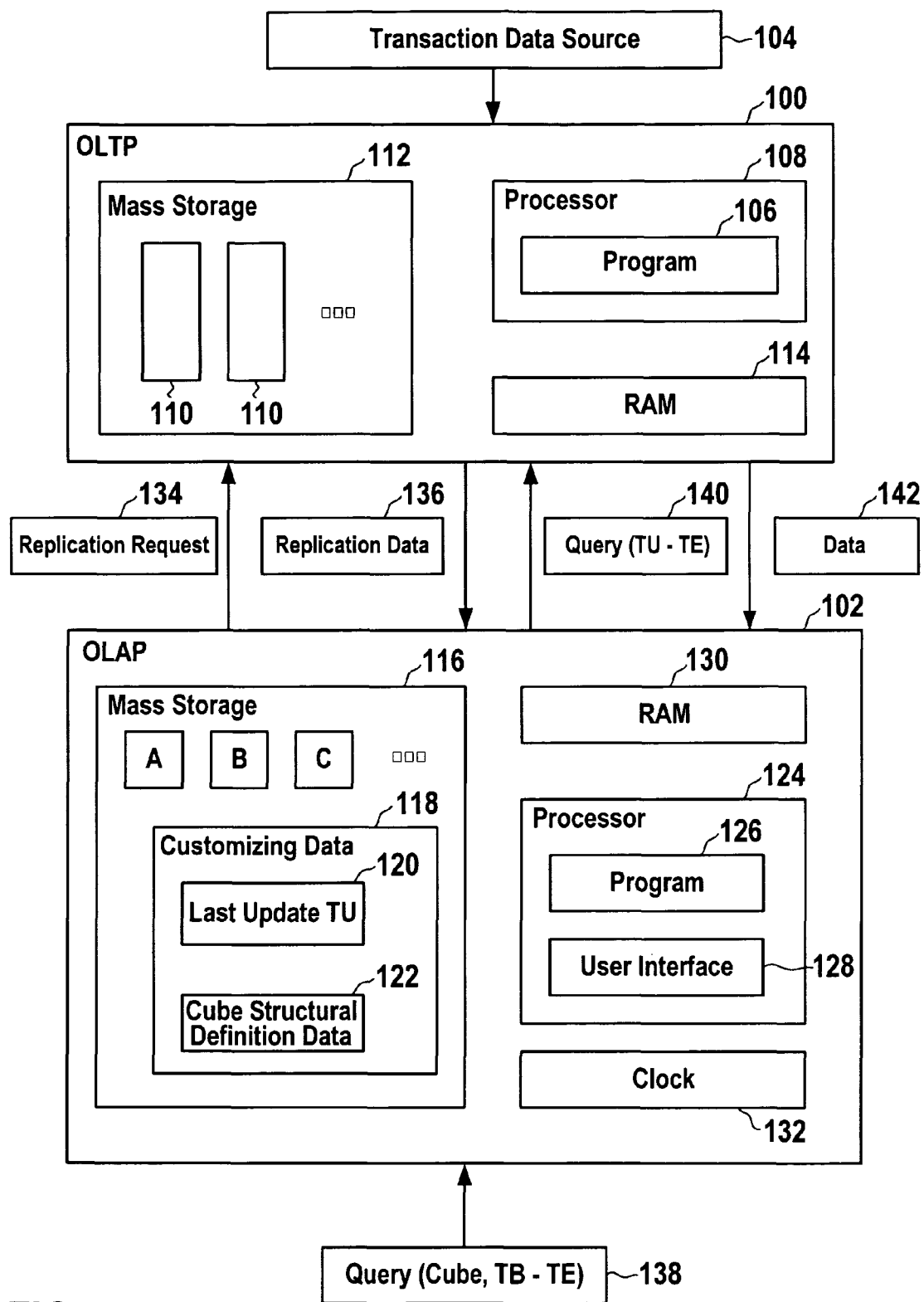
FIG. 1 illustrates a block diagram of an exemplary data processing system, consistent with an embodiment of the present invention.

FIG. 1 shows an exemplary data processing system that includes an OLTP database 100 and an OLAP database 102. OLTP database 100 may be configured as a relational database that is coupled to a transaction data source 104. Transaction data source 104 may provide real time or near real time transaction data to OLTP database 100, such as financial postings, logistic postings or postings from a manufacturing control system.

The transaction data provided by the transaction data source 104 in OLTP database 100 may be stored in database tables 110 by a program 106 that is executed by a processor 108 of the OLTP database 100. The database tables 110 may be stored on a mass storage device 112, such as a disc drive or tape drive. In addition, OLTP database 100 may include a random access memory (RAM) 114 that is used as a volatile main memory.

OLTP database 100 is coupled to the OLAP database 102 by a communication channel, such as by a computer network, e.g. the Internet, an intranet or extranet. The OLAP database 102 includes a mass storage device 116 for storing OLAP cubes A, B, C . . . and for storing customizing data 118.

Customizing data 118 may contain data 120 that indicates replication times when the OLAP database 102 is synchronized with the OLTP database 100. This data 120 may explicitly indicate the last replication time or it may define a replication scheme. For example, the data 120 may indicate a specific time of the day or night when the synchronization of the OLAP database 102 and the OLTP database 100 is to be performed. Preferably, the data 120 specifies a time when the loading of the OLTP database 100 with incoming transaction data from transaction data source 104 is expected to be at a minimum.

Customizing data 118 further comprises cube structural definition data 122. The cube structural definition data 122 describes the data structure of each of the OLAP cubes A, B, C . . . without including the respective OLAP cube data. Further, OLAP database 102 includes a processor 124 for execution of a program 126 and a program 128 that provides a user interface (e.g., GUI), a random access memory 130 that is used as a volatile main memory, and a clock 132 that provides a time reference. By way of example, clock 132 may be implemented as a so-called real time clock (RTC) that is battery powered.

In operation, the transaction data source 104 may provide a flow of transaction data to the OLTP database 100. The transaction data is processed and stored in the database tables 110 on mass storage device 112 by the program 106.

When the next replication time as defined by the data 120 is reached, the OLAP database 102 sends a corresponding replication request 134 to the OLTP database 100 in order to request synchronization of the OLAP database 102 with the OLTP database 100. In response, program 106 reads at least the data that has been added or modified from the database tables 110 and sends this data as replication data 136 to OLAP database 102 for updating of the OLAP cubes A, B, C . . . . The replication data 136 may be a copy of the transaction data stored in the database tables or it may be an aggregation of such transaction data; in the latter case, aggregation is performed by the program 106.

A user may enter a query 138 into OLAP database 102 by means of a user interface provided by the program 128. The user may further select one of the OLAP cubes that are available in the OLAP database 102 and a time interval between a beginning time TB and an end time TE that is of interest for the user.

In response to the query 138, the program 126 may read the OLAP cube specified in the query 138 from mass storage device 116 into RAM 130. In addition, the program 126 determines whether the time interval specified in the query 138 is covered by the OLAP cube data that has been read from the mass storage device 116. The OLAP cube data read from the mass storage device 116 is complete if the upper limit of the time interval (i.e., time TE), is not after the time of the last update TU (i.e., the last replication time given by data 120). However, if the upper limit TE of the interval is past the time TU, additional data is required from the OLTP database 102.

For example, the actual time and date provided by clock 132 is 4 Jun. 2004, 16 h. At this time the user enters a query 138 specifying a time interval between 4 May 2004 and 4 Jun. 2004, 15 h. The data 120 specifies 2 h am as the replication scheme.

Using the data 120 and the current time provided by clock 132, the program 126 determines that the last replication has been performed on 4 Jun. 2004 at 2 h am. Thus, transactional data that has been received by the OLTP database 100 between 4 Jun. 2004, 2 h am and 4 Jun. 2004, 15 h is not contained in the respective OLAP cube stored by the mass storage device 116.

As a consequence, the program 126 generates a query that specifies this time interval, i.e., the time between the last synchronization between the OLTP database 100 and the OLAP database 102 and the upper limit TE of the time interval specified in the query 138. In addition, the query 140 may contain an SQL statement that corresponds to the cube structural definition data 122 of the cube that is specified in the query 138.

In response to the query 140, program 106 may read data from mass storage device 112 that matches the query and provides this data 142 to OLAP database 102 where it is stored in RAM 130. The data 142 complements the OLAP cube data that has been read from the mass storage device 116. On the basis of the OLAP cube data and the data 142 that is temporarily stored in RAM 130, the program 126 generates an output that is shown to the user by means of the user interface. Preferably, the output is tabular and has the same form irrespective of whether data 142 has been used for generating the output or not.

Figure 2:
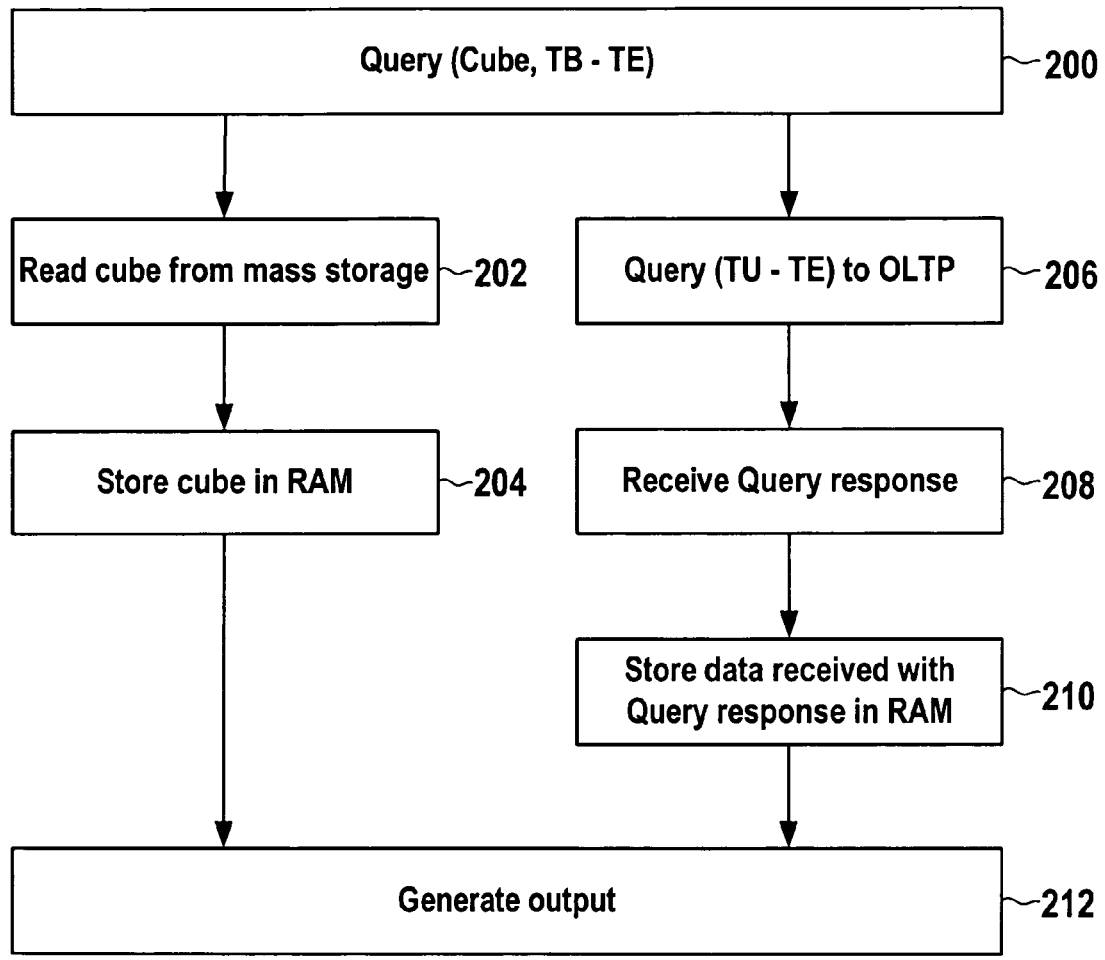
FIG. 2 illustrates a flowchart of an exemplary mode of operation of the data processing system of FIG. 1, consistent with an embodiment of the invention.

FIG. 2 shows a flowchart of an exemplary process, consistent with an embodiment of the invention. In stage 200, a user enters a query that specifies one of the OLAP cubes and a time interval between TB and TE that is of interest for the user.

In response, the respective OLAP cube data is read from the mass storage of the OLAP database (stage 202). The OLAP cube data is stored in the RAM of the data processing system in stage 204. In parallel to stages 202 and 204, or sequentially, the stages 206 to 210 are executed in order to complement the OLAP cube data with data from the OLTP database, if necessary.

If the upper limit of the interval specified in the query is past the last replication time TU, i.e., the time of the last synchronisation of the OLAP and OLTP databases, a query is generated and sent to the OLTP database in order to obtain transaction data from the OLTP database that has been received from the transaction data source in the time interval spanning the last replication TU and the upper limit TE of the time interval of interest to the user. In stage 208, the query response is received from the OLTP database and stored in RAM (stage 210). This data received from the OLTP database complements the OLAP cube data read from the mass storage of the OLAP database. In stage 212, the OLAP cube data and the data received as a query response from the OLTP database is used to generate an output as a response to the query received in stage 200.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data processing system, comprising:
a relational database for storage of transaction data;
an OLAP database for storage of a replication of the transaction data in an OLAP cube, the OLAP database having a plurality of OLAP cubes and structural cube definition data for the OLAP cubes;
a processor;
a random access memory, storing instructions that cause the processor to perform a method comprising:
storing data indicative of a replication time in the OLAP database, the data indicative of the replication time being replicated from the relational database at the replication time;
receiving a request for data stored in the OLAP database, the request specifying at least a first time interval and a name of the OLAP cube in the OLAP database, wherein the first time interval includes an upper limit and a lower limit;
reading an actual time from a time reference and determining the replication time using the actual time and a replication time scheme;
reading, after receiving the request, OLAP cube data from a OLAP cube associated with the name, wherein the OLAP cube data is associated with a first portion of the data in the request;

storing the OLAP cube data in the random access memory;

generating a query for the relational database when the upper limit of the first time interval specified in the request is more recent than the replication time, wherein the query specifies a second time interval that includes a lower limit given by the replication time and an upper limit given by the upper limit of the first time interval, and the query is associated with a second portion of the data in the request;

receiving replication data from the relational database in response to the query; storing the replication data in the random access memory; and generating an output as a response to the request using the OLAP cube data and the replication data stored in the random access memory.

2. The data processing system of claim 1, wherein the relational database is an OLTP database.

3. The data processing system of claim 1, wherein the query comprises an SQL statement corresponding to the structural cube definition data of the OLAP cube.

4. The data processing system of claim 1, wherein the output is a data table.

5. A computerized data processing method, comprising:

storing data indicative of a replication time in the OLAP database, the data indicative of the replication time being replicated from the relational database at the replication time, wherein the OLAP database is a database for storage of a replication of the transaction data in an OLAP cube, the OLAP database having a plurality of OLAP cubes and structural cube definition data for the OLAP cubes;

reading an actual time from a time reference and determining the replication time using the actual time and a replication time scheme;

receiving a request for data stored in the OLAP database, the request specifying at least a first time interval and a name of the OLAP cube in the OLAP database, wherein the first time interval includes an upper limit and a lower limit;

reading, after receiving the request, OLAP cube data from a OLAP cube associated with the name, the OLAP cube data being associated with a first portion of the data in the request; storing the OLAP cube data in a random access memory;

electronically generating a query for a relational database storing up-to-date transaction data when the upper limit of the first time interval specified in the request is more recent than the replication time, wherein the query specifies a second time interval that includes a lower limit given by the replication time and an upper limit given by the upper limit of the first time interval, and the query is associated with a second portion of the data in the request; electronically receiving replication data from the relational database in response to the query;

storing the replication data in the random access memory; and generating an output as a response to the request using the OLAP cube data and the replication data stored in the random access memory.

6. The method of claim 5, wherein the relational database is an OLTP database that is coupled to a transaction data source.

7. The data processing method of claim 5, wherein the replication time scheme is stored as part of customizing data.

8. A storage device storing a program for causing a computer to perform a method for processing data, the method comprising:

storing data indicative of a replication time in the OLAP database, the data indicative of the replication time being replicated from the relational database at the replication time, wherein the OLAP database is a database for storage of a replication of the transaction data in an OLAP cube, the OLAP database having a plurality of OLAP cubes and structural cube definition data for the OLAP cubes;

reading an actual time from a time reference and determining the replication time using the actual time and a replication time scheme;

receiving a request for data stored in the OLAP database, the request specifying at least a first time interval and a name of the OLAP cube in the OLAP database, wherein the first time interval includes an upper limit and a lower limit;

reading, after receiving the request, OLAP cube data from a OLAP cube associated with the name, the OLAP cube data being associated with a first portion of the data in the request;

storing the OLAP cube data in a random access memory;

electronically generating a query for a relational database storing up-to-date transaction data when the upper limit of the first time interval specified in the request is more recent than the replication time, wherein the query specifies a second time interval that includes a lower limit given by the replication time and an upper limit given by the upper limit of the first time interval, and the query is associated with a second portion of the data in the request;

electronically receiving replication data from the relational database in response to the query;

storing the replication data in the random access memory; and generating an output as a response to the request using the OLAP cube data and the replication data stored in the random access memory.

9. The storage device of claim 8, wherein the OLAP database includes a plurality of OLAP cubes and structural cube definition data for each of the plurality of the OLAP cubes.

* * * * *